June 17, 1941.  F. O. RILEY  2,246,076
SWIVEL SEAT MECHANISM
Filed Aug. 15, 1938  3 Sheets-Sheet 1
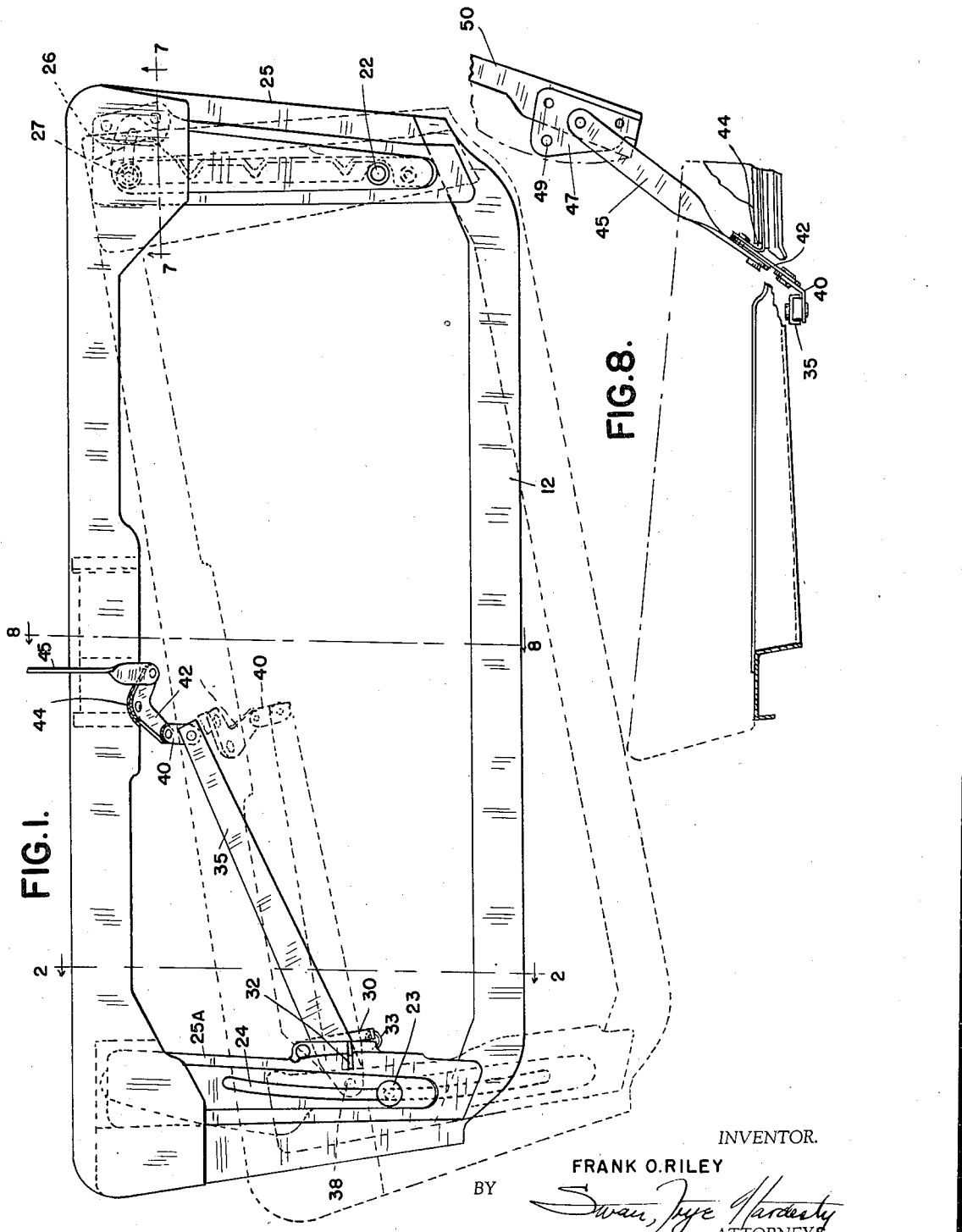
INVENTOR.
FRANK O. RILEY
BY
ATTORNEYS

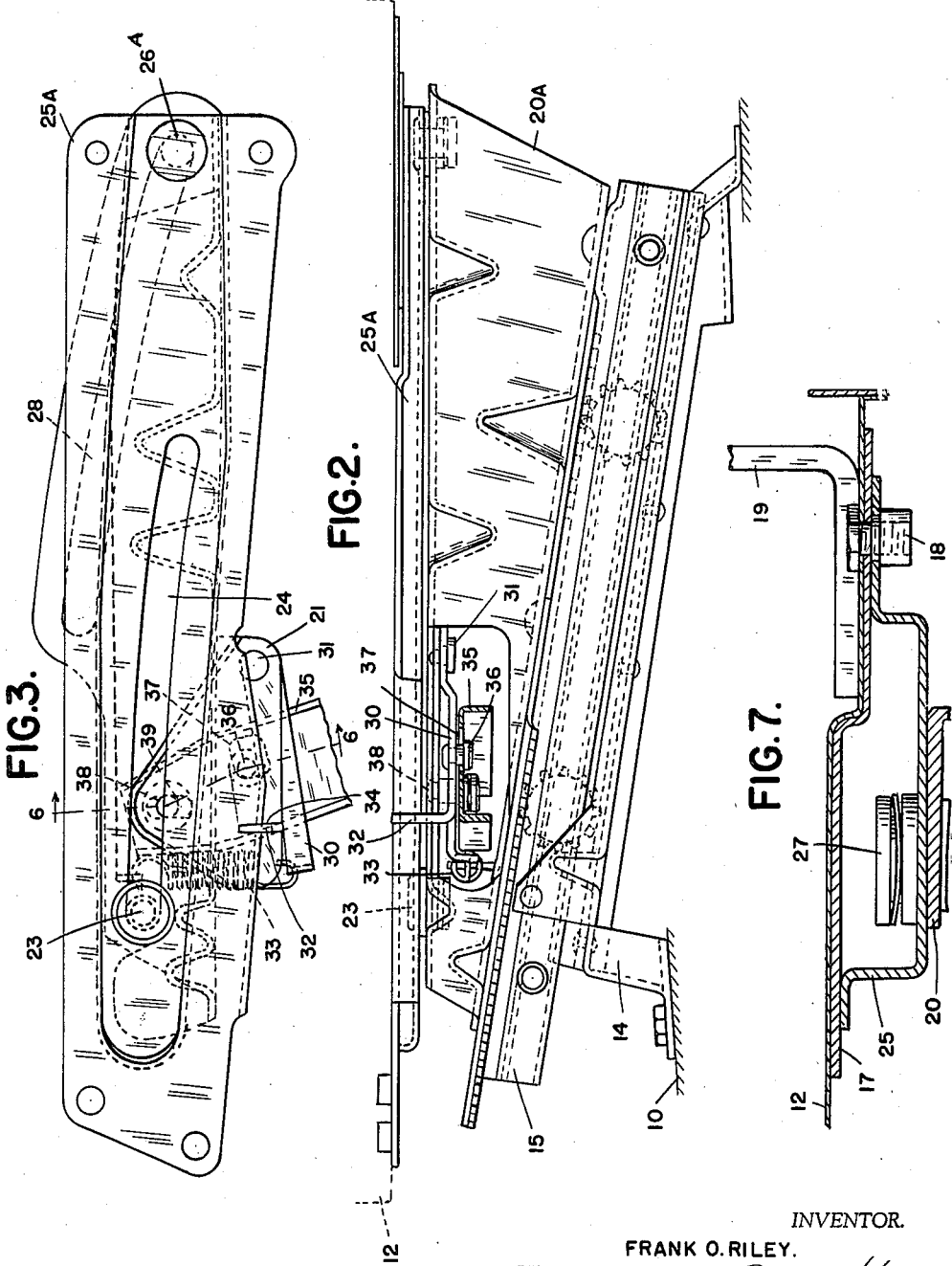

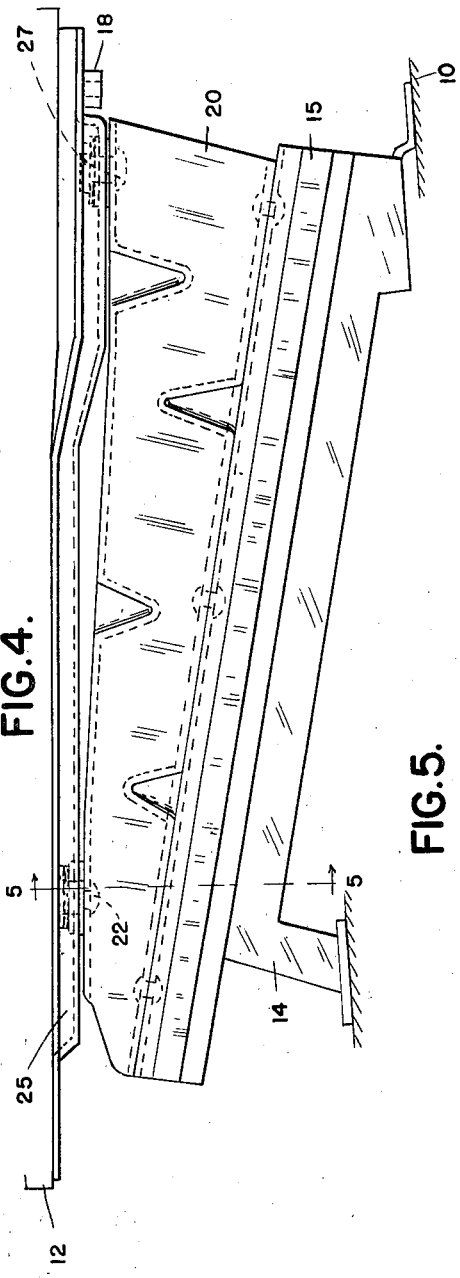

Patented June 17, 1941

2,246,076

UNITED STATES PATENT OFFICE 2,246,076

SWIVEL SEAT MECHANISM

Frank O. Riley, Pontiac, Mich., assignor to American Forging & Socket Company, Pontiac, Mich., a corporation of Michigan Application August 15, 1938, Serial No. 224,930

4 Claims. (Cl. 155—14)

This invention relates to supporting means for seats, particularly for the seats of vehicles, having for its principal object the provision of improved means for so mounting such a seat that although normally held very rigidly in position, it may be swung bodily toward the front or rear, about a vertical axis located near one end.

An important object is also, to provide such a mechanism of extremely simple and inexpensive construction, which is usable in conjunction and does not interfere with other adjustable supporting means arranged to permit independent bodily movement of the seat in a rectilinear path toward the front or rear.

Another object is to provide such pivotal mounting means so arranged as to enable easy swinging of the seat forwardly about one end, to facilitate access to space behind the same as, for example, in two-door types of passenger motor cars.

A further object is to provide such a mechanism especially adapted for use in conjunction with a seat having one or more hinged back sections, and so arranged that the seat is firmly locked against swinging when the back is raised to normal position, while when the hinged seat back is swung forwardly, the locking means is released to allow such bodily swinging movement of the entire seat.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a plan view of seat supporting means constructed in accordance with the present invention, indicating the location of the parts with relation to a seat frame carried thereby.

Figure 2 is a section taken substantially on the line 2—2 of Figure 1, and looking in the direction of the arrows, showing one of the supporting assemblies in side elevation.

Figure 3 is a plan view of such assembly.

Figure 4 is a side elevational view of the other supporting assembly.

Figure 5 is a vertical sectional view taken substantially on the line 5—5 of Figure 4, and looking in the direction of the arrows.

Figure 6 is a sectional view taken substantially on the line 6—6 of Figure 3, and looking in the direction of the arrows; and Figures 7 and 8 are sectional views taken substantially on the lines 7—7 and 8—8 respectively of Figure 1, and looking in the direction of the arrows.

Referring now to the drawings, in which reference character 10 designates a floor and 12 indicates a seat frame, it will be seen that two separate supporting assemblies are used, one located beneath and to carry each end of the seat. Each such assembly is formed in two sections, one above the other, in the shown construction. The lower sections, which may be substantially similar to each other, comprise a track portion 14, bolted or otherwise secured to the floor, and a carriage 15 rollably mounted on the track. These constitute adjustable supporting means allowing bodily movement of the seat toward the front and rear to adjust its position to suit the convenience or comfort of the occupants, but the construction of such supporting means forms no part of the present invention and will not be considered in detail. In fact such adjustable supporting means might be eliminated entirely, and the mounting brackets 20, 20A shown as carried thereby could, insofar as the present invention is concerned, be attached directly to the floor.

In accordance with the present invention, however, one of the mounting brackets is pivotally connected to the seat, while the opposite mounting bracket carries guide means allowing the seat to swing bodily about such pivotal axis. The mounting bracket 20, shown as attached to one of the carriage members, forms an upward continuation thereof and carries near its forward end an upwardly projecting pivot pin 22, upon which is swingably mounted a swivel plate 25 fastened to the bottom of the seat frame. The swivel plate 25 overlies the supporting bracket and is further guided with respect thereto by an arcuate slot 26 concentric with pin 22 and slidably overengaging a pin 27 projecting upwardly thereinto from the mounting bracket. A reinforcing plate 17 stiffens swivel plate 25 near the rear, where it is attached to the seat frame 12 as by means of clinch nuts 18 and cooperating screws (unshown). In Figure 7, which shows these parts best, a part of the hinge bracket, 19, by which the seat back is pivotally attached, is also shown.

The opposite carriage member, at the other end of the assembly, carries a similar mounting bracket 20A, to which is slidably connected a swivel plate 25A, guided to swing concentrically about the pivot pin 22, and so to allow bodily swinging movement of the end of the seat supported thereby, toward the front or rear. A guide pin 23 extends upwardly from the bracket member 20A through an arcuate slot 24 in the swivel plate 25A, and another guide pin 26A secured to the swivel plate 25A projects downwardly through an arcuate slot 28 in the supporting bracket 20A.

Pivoted at 31 to an inwardly projecting flange portion 21, pressed from the channel-shaped supporting bracket 20A and somewhat depressed below the top web thereof (Figure 6), is a locking dog 30 (Figures 2 and 3), extending forwardly and having an upwardly projecting tooth portion 32 swingable through a notch (undesignated) in the flange 21 and into and out of engagement (when aligned therewith) with a slot or notch 34 cut in one edge of the swivel plate. A spring 33 urges the dog toward such latched position.

An operating link 35 for the dog, having lost-motion connection therewith, extends angularly inwardly and toward the rear of the seat frame. The shouldered rivet 36 carried by the locking dog projects through an enlarged opening 37 in the operating link, the shape of such opening being best shown in Figure 3. The free end of the link 35 is also guided by a pin 38 projecting downwardly from the bracket member 28A through longitudinal slot 39 in the link. At its inner end the operating link is articulated by means of a short link 40 to a bellcrank 42 pivoted on the seat frame, as upon a bracket 44. A link 45 connected to the other arm of the bellcrank extends upwardly therefrom and is pivoted at its upper end to a supporting plate 47 which carries the seat back frame 50. The seat back is swingable forwardly and downwardly about the pivotal axis (designated 49) of support, and such forward and downward movement of the seat back will be seen to tend to raise the link 45, thus swinging the bellcrank 42 and moving the link 35 inwardly. Such motion is sufficient to free the locking dog from the swivel plate 25A, and so to allow the seat to swing forwardly about the pivot axis 22. The locking notch 34 is so located that when the dog is engaged therein the seat is held in a transverse position properly centered over the supporting assembly and at the rear extremity of the pivotal movement allowed by the guide slots 24—28. When the seat back is moved forwardly and downwardly, however, to the limit of the movement allowed by slots 37—39 in the operating link, further forward pressure exerted upon the seat back acts to swing the seat forwardly.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In combination with a support and a seat assembly having a base and a hinged back swingable forwardly from its normal upstanding position at the rear of the base, means for movably supporting the seat assembly including a pivot portion allowing swinging movement of the seat assembly about a substantially vertical axis located near one end thereof, guide means near the other end of the seat assembly for guiding movement of the same concentrically about such axis, latch means cooperating with such guiding means to releasably hold the seat assembly against such swinging movement, means responsive to movement of said hinged back for operating said latch means, said guide means including a notched plate portion slidable over said support, the latch means including a dog movable in a path fixed with respect to the support and engageable with and disengageable from the notched portion of the plate, and a lost motion connection between the operating means and the dog.

2. In combination with a support and a seat assembly having a base and a hinged back swingable forwardly from its normal upstanding position at the rear of the base, means for movably supporting the seat assembly including a pivot portion allowing swinging movement of the seat assembly about a substantially vertical axis located near one end thereof, guide means near the other end of the seat assembly for guiding movement of the same concentrically about such axis, latch means cooperating with such guiding means to releasably hold the seat assembly against such swinging movement, means responsive to movement of said hinged back for operating said latch means, said latch means including a dog movable, in a path fixed with respect to the support, to and from a position to block movement of the seat assembly, said operating means including a link connected at one end to said back and at its other end having lost motion connection with said dog.

3. In combination with a support and a seat assembly having a base and a hinged back swingable forwardly from its normal upstanding position at the rear of the base, means for movably supporting the seat assembly including a pivot portion allowing swinging movement of the seat assembly about a substantially vertical axis located near one end thereof, guide means near the other end of the seat assembly for guiding movement of the same concentrically about such axis, latch means cooperating with such guiding means to releasably hold the seat assembly against such swinging movement, means responsive to movement of said hinged back for operating said latch means, said latch means including a dog movable, in a path fixed with respect to the support, to and from a position to block movement of the seat assembly about said axis, said operating means including a link connected at one end to said hinged back and actuable thereby to operate the dog, the other end of said link having lost motion connection with both the dog and the support.

4. In combination with a support and a seat assembly mounted thereon upon a base and having a hinged back swingable forwardly from its normal upstanding position at the rear of the base, means for movably supporting the seat assembly including a pivot portion to which said seat assembly is connected near one end, to allow swinging movement of the seat assembly about a substantially vertical axis, guide means near the other end of the seat assembly for guiding swinging movement of the same concentrically about such axis, comprising relatively slidable guide portions, one carried by the seat and the other by the support, latch means including a holding member carried by one of said guide portions and movable to and from operable engagement with the other thereof to enable releasable holding of the seat assembly against swinging movement, means including a link connecting the holding members to said seat back for operating said latch means in response to independent movement of said hinged back, said link being connected to the seat back at a point approximately midway between the ends of the seat, whereby its end which is connected to the seat assembly travels therewith during swinging movement thereof, said holding member to which the other end of the link is attached being mounted upon a portion which remains fixed during such swinging movement, said link providing lost motion connection between said seat back and holding member, and being bodily swingable with relation to both the support and the seat to permit swinging movement of the latter.

FRANK O. RILEY.